United States Patent [19]

Yamada

[11] Patent Number: 5,016,189
[45] Date of Patent: May 14, 1991

[54] AREA FILLING DEVICE

[75] Inventor: Masahiro Yamada, Tokyo, Japan

[73] Assignee: Ricoh Company, Ltd., Japan

[21] Appl. No.: 374,297

[22] Filed: Jun. 30, 1989

[30] Foreign Application Priority Data

Jul. 6, 1988 [JP] Japan .................. 63-166966

[51] Int. Cl.$^5$ ............................. G06F 15/62
[52] U.S. Cl. ..................... 364/518; 364/519
[58] Field of Search .......... 364/518, 521, 519; 340/728, 747

[56] References Cited

U.S. PATENT DOCUMENTS

| | | | |
|---|---|---|---|
| 4,763,119 | 8/1988 | Matsubara et al. | 340/747 |
| 4,829,295 | 5/1989 | Hiroyuki | 340/728 |
| 4,897,805 | 1/1990 | Wang | 364/521 |
| 4,962,468 | 10/1990 | Beauregard et al. | 364/521 |

Primary Examiner—Gary V. Harkcom
Assistant Examiner—Mark K. Zimmerman
Attorney, Agent, or Firm—Mason, Fenwick & Lawrence

[57] ABSTRACT

An area filling device includes an edge table memory for storing an edge table having data related to the edges, and an address table memory for storing edge table address data for every Y coordinate value. An operation circuit calculates data related to edges consisting of a closed loop figure. An active-edge table circuit forms first, second and third active-edge tables for every Y coordinate value from the data related to the edges stored in the edge table storing memory. The first and second active-edge tables indicate bit data having predetermined bits at X coordinate positions where there are an edge which is not a horizontal edge, and endpoints of a horizontal edge, respectively. The third active-edge table indicates bit data having a predetermined bit at an X coordinate position where there is an endpoint of an edge. A logic circuit inverts the predetermined bits defined in the first and second active-edge tables. An OR gate calculates an OR operation on the bit data from the logic circuit and the bit data related to the third active-edge table and supplied from the active-edge table circuit. The operation results serve as print data.

11 Claims, 13 Drawing Sheets

FIG. 5(B) LAET

FIG. 5(C) HAET

FIG. 5(D) PAET

FIG. 5(E)
OUTPUT OF D-F/F 29

OUTPUT OF D-F/F 30
FIG. 5(F)

OUTPUT OF OR31
FIG. 5(G)

OUTPUT OF D-F/F 32
FIG. 5(H)

AREA FILLING DEVICE

BACKGROUND OF THE INVENTION

The present invention generally relates to an area filling device, and particularly to an area filling device which receives coordinate data related to endpoints of edges forming a closed loop figure and generates image data for filling the internal area of the closed loop figure.

A method of filling the internal area of a polygon has been proposed in Y. Ohno, "Scan Conversion for a polygon", PIXEL, Jan. 1984, pp.136-141. The proposed method fills the area with black pixel data as follows.

(1) Each edge of a polygon is referred to. If an edge of concern is a horizontal edge, this is neglected. Alternatively, if the edge is not a horizontal edge, the lower endpoint of the edge which has a Y coordinate value smaller than that of the other edge thereof, is referred to. Then, all the edges of the polygon of concern are arranged in the increasing order of Y coordinate values from the smallest one of the Y coordinate values. Thereby, an edge table which indicates the arrangement of edges is created. The procedure for arranging edges is based on bucket sorting.

Next, an active-edge table is created and revised by repeatedly carrying out the following procedure from the minimum Y coordinate value Ymin to the maximum Y coordinate value Ymax.

1) If there is data related to an edge in the active-edge table, it is determined whether the edge of concern has been processed for predetermined times. When the result is affirmative, data related to this edge is deleted from the active-edge table. On the other hand, when the edge of concern has not yet been processed for the predetermined times, $X = X + (\Delta X/\Delta Y)$ is calculated. If data related to an edge for the present Y coordinate value exists in the edge table, the data related to the present edge is transferred to the active-edge table.

2) Data stored in the active-edge table are arranged in the increasing order of X coordinate values from the smallest one of the X coordinate values in accordance with a quick sorting process.

3) Edges are extracted from the active-edge table for every two edges, and data related to a line drawn between X coordinate values of the extracted edges is generated.

However, the above-mentioned method is not suitable for filling the internal area of a polygon at high speeds for the following reasons. First, the quick sorting process used when creating the active-edge table is complex and it takes a long time. Secondly, it is necessary to change, on the basis of the state of connection of neighboring edges, the calculation procedure for determining whether each edge registered in the active-edge table has been processed for the predetermined times. For example, it is necessary to refer to the previous edge or the next edge or another edge with respect to the present edge. Therefore, it takes a long time for the calculation procedure selecting process.

SUMMARY OF THE INVENTION

It is therefore a general object of the present invention to provide an improved area filling device in which the above-mentioned disadvantages are eliminated.

A more specific object of the present invention is to provide a simple area filling device capable of generating data for filling the internal area of a polygon at high speeds.

The above objects of the present invention can be achieved by an area filling device comprising receiving means for receiving X-Y coordinate data related to endpoints of edges consisting of a closed loop figure from an external device; edge table storing means for storing an edge table having data related to the edges; address table means for storing edge table address data for every Y coordinate value; operation means, connected to the receiving means, the edge table storing means and address table means, for calculating the data related to the edges from the endpoints supplied from the receiving means and for writing calculated data into a storage area of the edge table storing means indicated by the edge table address data defined in the address table means; active-edge table forming means, coupled to the edge table storing means and the address table means, for forming first, second and third active-edge tables for every Y coordinate value from the data related to the edges stored in the edge table storing means, the first active-edge table indicating bit data having a predetermined bit at an X coordinate position where there is an edge which is not a horizontal edge, the second active-edge table indicating bit data having predetermined bitS at X coordinate positions where there are endpoints of a horizontal edge, the third active-edge table indicating bit data having a predetermined bit at an X coordinate position where there is an endpoint of an edge; logic means, coupled to the active-edge table forming means, for inverting the bit data included in the first active-edge table each time the predetermined bit defined in the first active-edge table appears and for inverting the bit data included in the second active-edge table each time the predetermined bit defined in the second active-edge table appears; and OR gate means, coupled to the active-edge table forming means and the logic means, for receiving the bit data related to the first and second active-edge tables and supplied from the logic means and the bit data related to the third active-edge table and supplied from the active-edge table forming means and for calculating an OR operation on the received bit data, the results of the OR operation obtained for every Y coordinate value forming print data.

Other objects, features and advantages of the present invention will become apparent from the following detailed description when read in conjunction with the accompanying drawings.

DESCRIPTION OF THE PREFERRED EMBODIMENTS

A description is given of a preferred embodiment of the present invention.

Figure 1:
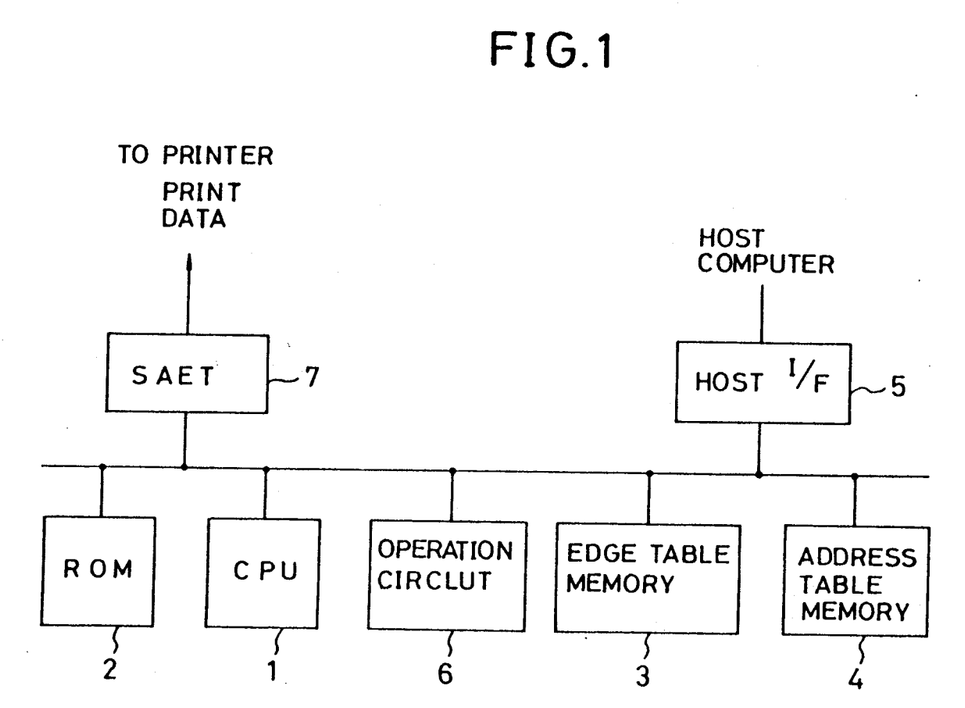
FIG. 1 is a block diagram of a preferred embodiment of the present invention.

Referring to FIG. 1, there is shown an area filling device of a preferred embodiment of the present invention. A central processing unit (hereinafter simply referred to as a CPU) 1 controls an area filling procedure, which will be described in detail later. The CPU 1 can communicate with a host computer (not shown) through a host interface circuit 5. For example, the host computer supplies the area filling device with image data. A read only memory (hereinafter simply referred to as a ROM) 2 stores a program for defining the operation of the CPU 1. An edge table memory 3 is used for creating an edge table (ET), and is formed by a random access memory (hereinafter simply referred to as a RAM), for example. An address table memory 4 is used for storing an address table, in which a storage area or table area is provided for each Y coordinate value.

An operation circuit 6 receives X coordinate values $X_i$ and $X_{i+1}$ and Y coordinate values $Y_i$ and $Y_{i+1}$ (i is an arbitrary number) from the host computer under the control of the CUP 1, and generates data S, Xs, Ys, H, and delta−X. S indicates whether an edge of concern is a horizontal edge. For example, when an edge of concern is a horizontal edge, S=1. On the other hand, when the edge is not a horizontal edge, S=0. Xs is the X coordinate value which indicate a start point of an edge of concern. The start point corresponds to one of the two endpoints of the edge having a Y coordinate value smaller than that of the other endpoint. For example, when $Y_i < Y_{i+1}$, Xs=$X_i$. H is the height defined as Ye−Ys where Ye is the Y coordinate value of the end point of the edge of concern, and Ys is the Y coordinate value of the start point thereof. The data delta−X is a variation defined as $\Delta X/\Delta Y$ where $\Delta X = Xe - Xs$, and $\Delta Y = Ye - Ys$. Xe is the X coordinate value of the end point of an edge of concern, and Xs is the X coordinate value of the start point thereof.

An active-edge table circuit (SAET) 7 is used for sorting edges according to X coordinate values for every Y coordinate value. For example, edges related to a Y coordinate value are arranged in the increasing order of X coordinates from the smallest one of the X coordinate values. The active-edge table circuit 7 includes three active-edge tables, which consist of a first active-edge table HAET for a horizontal edge, a second active-edge table LAET for a non-horizontal edge, and a third active-edge table PAET for an endpoint of an edge. Each of the first, second and third active edges has a storage capacity equal to n × 1 (bit) where n is the number of pixels in the X direction. For example, a printer (not shown) is connected to the active-edge table circuit 7.

Figure 2:
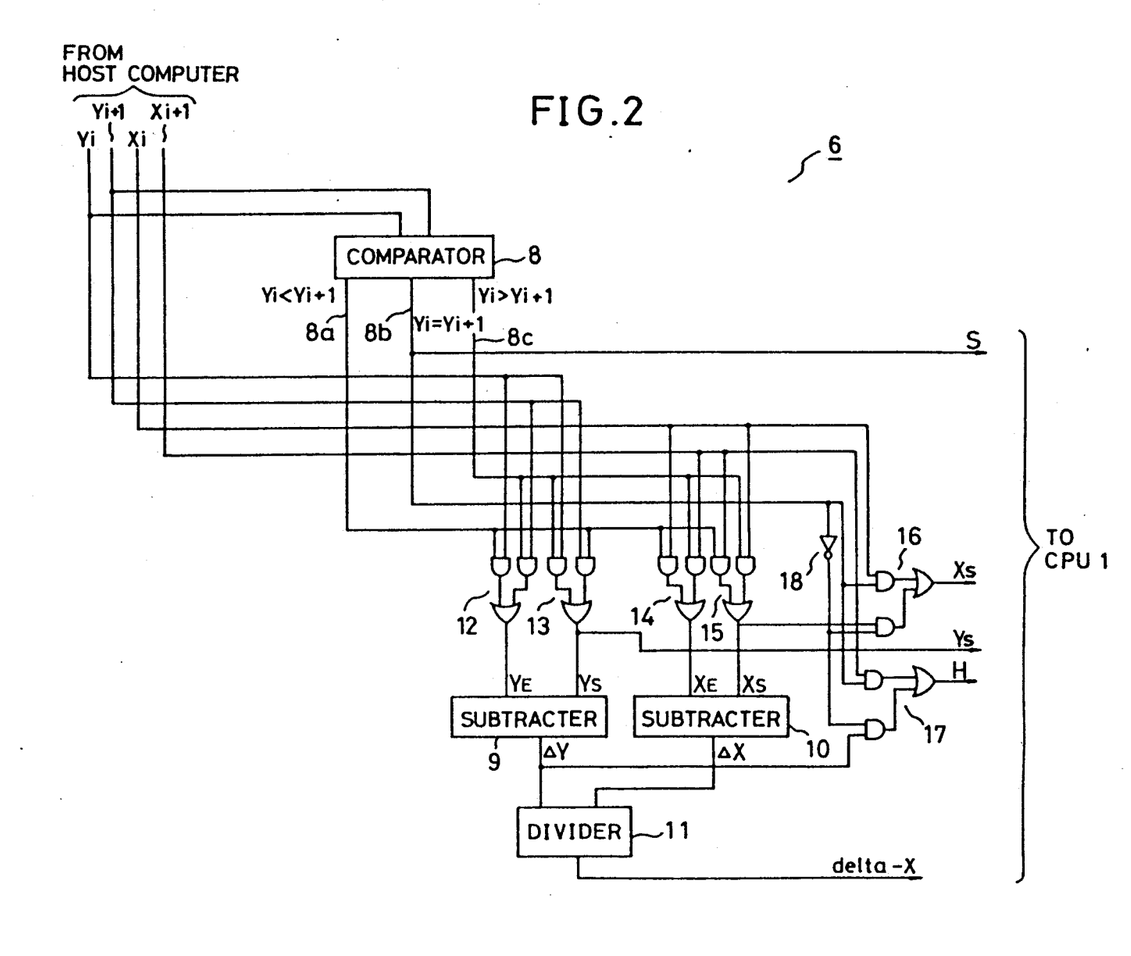
FIG. 2 is a circuit diagram of an operation circuit used in the configuration of FIG. 1.

FIG. 2 is a circuit diagram of the operation circuit 6. As shown, the operation circuit 6 includes a comparator 8, subtracters 9, 10, a divider 11, logic circuits 12 through 17, and an inverter 18. The comparator 8 compares the Y coordinate values $Y_i$ and $Y_{i+1}$, and outputs the comparison results $Y_i < Y_{i+1}$, $Y_i = Y_{i+1}$, and $Y_i > Y_{i+1}$ through signal lines 8a, 8b and 8i c, respectively. The data S corresponds to the comparison result on the signal line 8b. The logic circuit 12 consists of two AND gates and a single OR gate. The logic circuit 12 receives the Y coordinate values $Y_i$, $Y_{i+1}$ and the comparison results on the signal lines 8a and 8c, and generates the Y coordinate value of the end point Ye. Similarly, the logic circuit 13 consists of two AND gates and a single OR gate, and generates the Y coordinate value of the start point Ys from the Y coordinate values $Y_i$, $Y_{i+1}$ and the comparison results on the signal lines 8a and 8c. The subtracter 9 generates $\Delta Y$ from the Y coordinate data Ye and Ys supplied from the logic circuits 12 and 13, respectively.

The logic circuit 14 consists of two AND gates and a signal OR gate. The logic circuit 14 receives the X coordinate values $X_i$, $X_{i+1}$ and the comparison results on the signal lines 8a and 8c, and generates the X coordinate value of the end point Xe. Similarly, the logic circuit 15 consists of two AND gates and a signal OR gate, and generates the X coordinate value of the start point Xs from the X coordinate values $X_i$, $X_{i+1}$ and the comparison results on the signal lines 8a and 8c. The subtracter 10 generates $\Delta X$ from the X coordinate data Xe and Xs supplied from the logic circuits 14 and 15, respectively. The divider 11 generates delta−X from the $\Delta Y$ and $\Delta X$.

The inverter 18 inverts the comparison result on the signal line 8b. The inverted result from the inverter 18 is supplied to the logic circuits 16 and 17. The logic circuit 16 consists of two AND gates and a single OR gate. The logic circuit 16 receives the X coordinate value $X_i$, the result on the signal line 8b, the X coordinate value Xs, and the inverted result from the inverter 18, and generates the X coordinate value of the start point Xs. The logic circuit 17 consists of two AND gates and a single OR gate. The logic circuit 17 receives the X coordinate value $X_{i+1}$, the result on the signal line 8b, the inverted result from the inverter 18, and the data $\Delta Y$, and generates the height H.

The operation of the operation circuit 6 is summerized as follows.

For $$Y_i < Y_{i+1}, Ys = Y_i, Ye = Y_{i+1}, Xs = X_i, Xe = X_{i+1}.$$

For $$Y_i > Y_{i+1}, Ys = Y_{i+1}, Ye = Y_i, Xs = X_{i+1}, Xe = X_i.$$

Then the subtracter 9 calculates $\Delta Y$ (=Ye−Ys), and the subtracter 10 calculates $\Delta X$ (=Xe−Xs). The divider 11 calculates delta-X (=$\Delta X/\Delta Y$). When S=1, Xs=$X_i$ and H=$X_{i+1}$. When S=0, H=$\Delta Y$.

Figure 3:
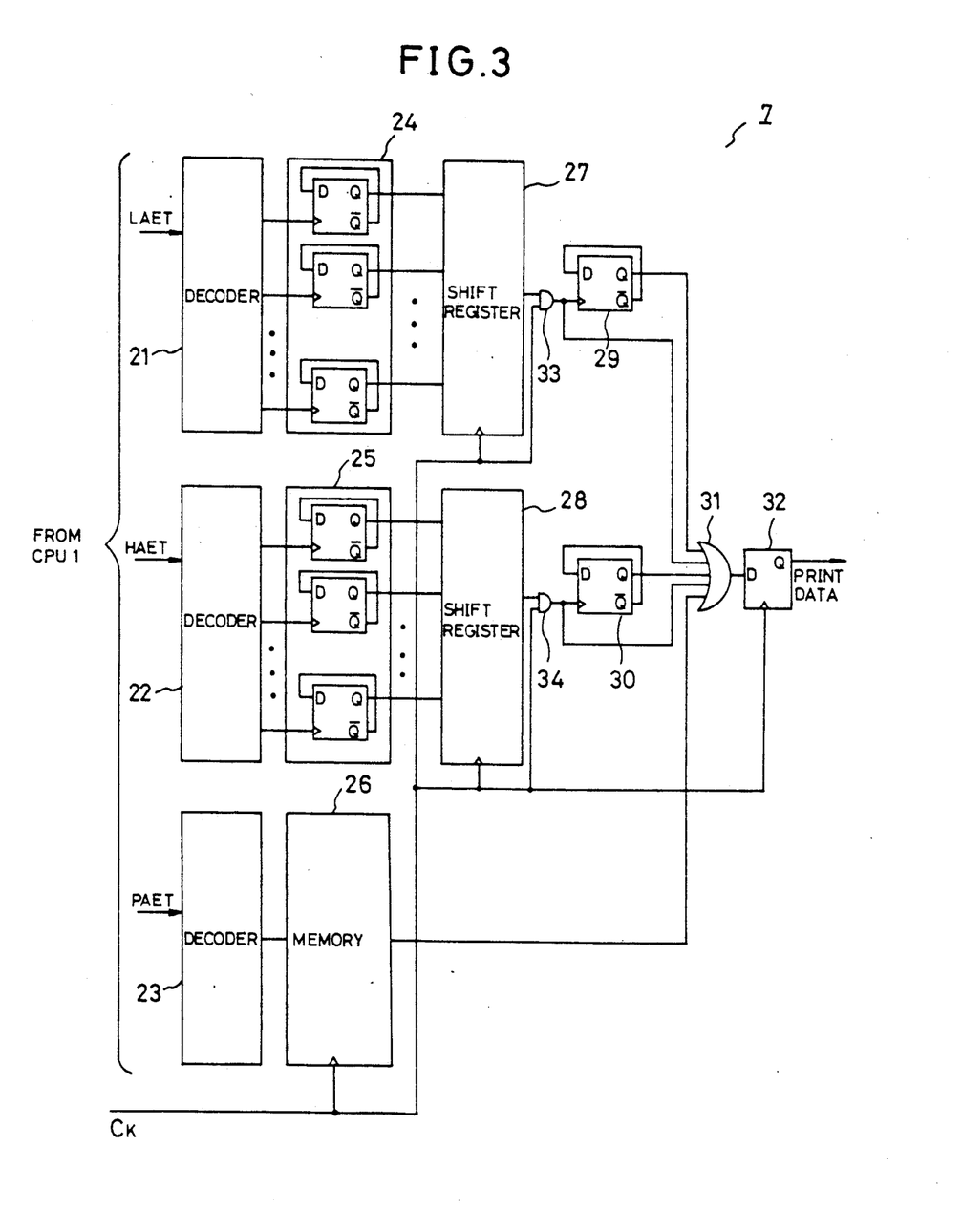
FIG. 3 is a circuit diagram of an active-edge table circuit used in the configuration of FIG. 1.
Figure 5A:
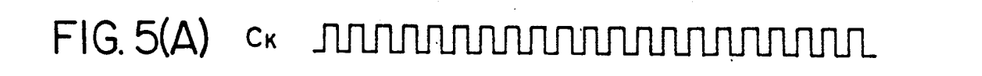
FIGS. 5A through 5H are a timing chart illustrating how to create print data from the active-edge tables shown in FIG. 4.

FIG.3 is a block diagram of the active-edge table circuit 7. The active-edge table circuit 7 includes three decoders 21, 22, and 23, which are related to a non-horizontal edge LAET, a horizontal edge HAET, and an endpoint of an edge, respectively. The decoder 21 is provided, for each Y coordinate address, X coordinate address data indicative of the presence of data related to a non-horizontal edge of a polygon. The supplied address data consists of address bits equal to n pixels in the X direction, and is supplied to the decoder 21 for every Y coordinate value. The decoder 21 outputs n bits of the address data in parallel form. The n bits of the decoded address are supplied to n related D-type flip-flops provided in a flip-flop circuit 24. When an address bit is 1, this is inverted through related one of the flip-flops. The output signals of the D-type flip-flops in parallel form are converted into an n-bit serial data through a shift register 27, which operates in synchronism with a clock signal Ck shown in FIG. 5(A). The clock signal Ck is generated by a clock generator (not shown). The serial data from the shift register 27 passes through an AND gate 33 and is supplied to a D-type flip-flop 29. The AND gate 33 is supplied with the clock signal Ck.

Figure 4A:
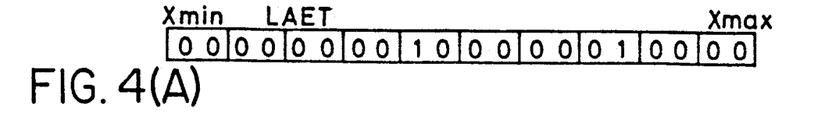
FIGS. 4A through 4C are a diagram of an active-edge table for a non-horizontal edge of a figure (LAET), an active-edge table for a horizontal edge (HAET), and an active-edge table for an endpoint of an edge.

FIG. 4(A) shows an output signal of the AND gate 33, which forms an active-edge table to be formed for every Y coordinate value. As shown in FIG. 4(A), a binary value '1' is given to an X address bit where data related to a non-horizontal edge exists.

The output signal of the AND gate 33 is supplied to a clock input terminal of the D-type flip-flop 29. The $\overline{Q}$-output terminal of the D-type flip-flop 29 is connected to the input signal thereof. The Q-output signal level of the D-type flip-flop 29 is alternatively changed each time the output signal of the AND gate 33 is supplied thereto. The Q-terminal output signal is then supplied to an OR gate 31, which is also supplied with the output signal of the AND gate 33. The data stored in the D-type flip-flops provided in the flip-flop circuit 24 are transferred to the shift register 27 after data equal to one line has been processed and before data related to the next line is processed.

The decoder 22, a flip-flop circuit 25, a shift register 28, an AND gate 34 and a D-type flip-flop 30 are the same as those for the above-mentioned configuration related to the active-edge table LAET for a non-horizontal edge. The decoder 22 is provided with, for every Y coordinate value, X coordinate address data indicative of the presence of data related to a horizontal edge. The address data consists of n bits. The output signal of the AND gate 34 forms an active-edge table HAET to be formed for every Y coordinate value.

Figure 4B:
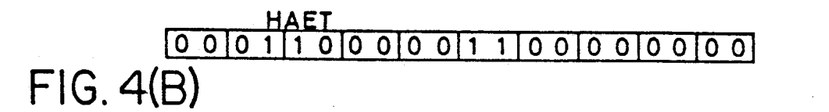

FIG. 4(B) shows an active-edge table HAET for a horizontal edge. The address data HAET includes binary values '1' related to X coordinate values of the start and end points of a horizontal line of concern.

A decoder 23 is supplied with X coordinate address data indicative of an endpoint of an edge for every Y coordinate value. The supplied address data includes an address bit of 1 at an X coordinate value where there is an endpoint of an edge. The output signal of the decoder 23 passes through a storage element 26, and is then supplied to the OR gate 31. The decoder 23 and the storage element 26 are also used for putting the address data PAET in phase with the address data LAET and HAET. The storage element 26 can be formed by a RAM.

Figure 4C:
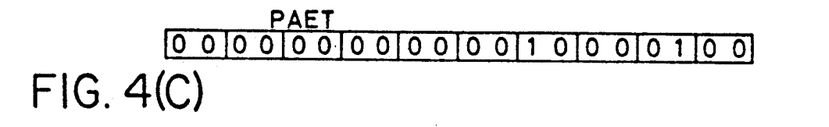

FIG. 4(C) illustrates the output signal of the storage element 26, which forms an active-edge table PAET indicative of the presence of an endpoint of an edge. The active-edge table PAET is formed for every Y coordinate value.

Figure 5B:
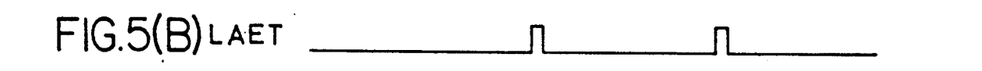
Figure 5C:
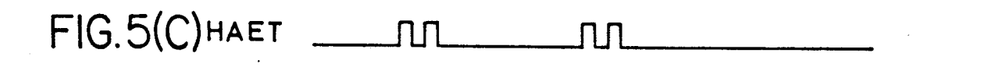
Figure 5D:
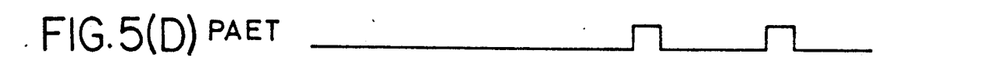
Figure 5E:
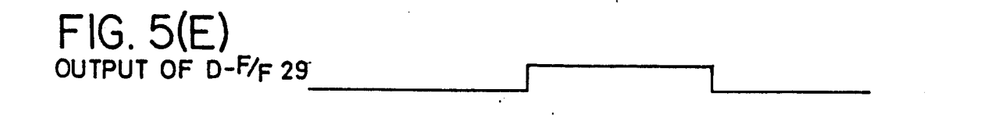
Figure 5F:
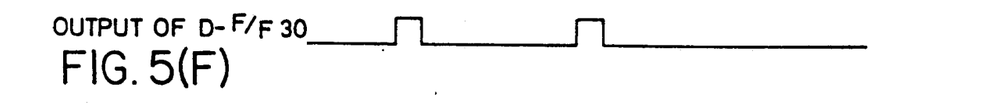
Figure 5G:
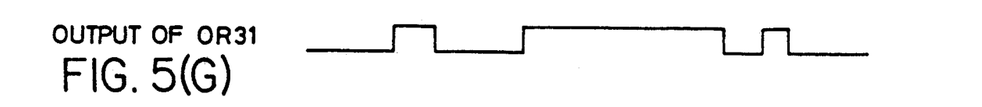
Figure 5H:
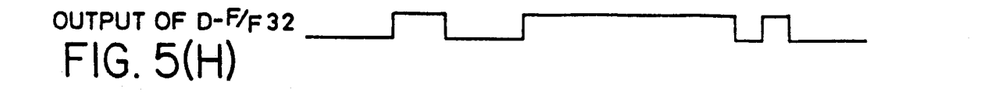

FIGS. 5(B), 5(C) and 5(D) are timing charts related to the active-edge tables LAET, HAET and PAET shown in FIGS. 4(A), 4(B) and 4(C). In response to the active-edge tables LAET and HAET, the D-type flip-flops 29 and 30 output signals shown in FIGS. 5(E) and 5(F), respectively. Then an output signal shown in FIG. 5(G) is derived from the OR gate 31, and supplied to a D-type flip-flop 32, which generates an output signal shown in FIG. 5(H).

Figure 6:
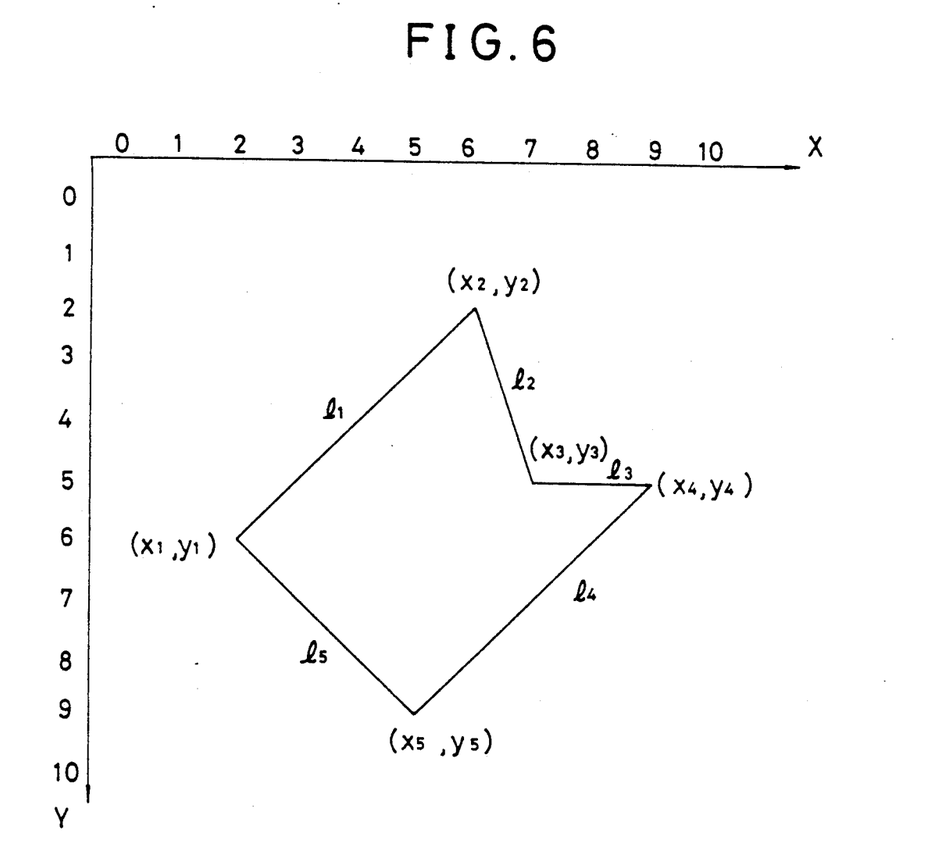
FIG. 6 is a diagram of a figure which is to be processed in the embodiment.

A description is given of an operation of the present embodiment. It is now assumed that the internal area of a closed loop figure shown in FIG. 6 is filled with black pixel data. The illustrate figure consists of edges $1_1$ to $1_5$. The area filling procedure according to the present embodiment commences to initialize an address table AT formed in the address table memory 4 by writing NULL in all the storage areas.

Figure 7:
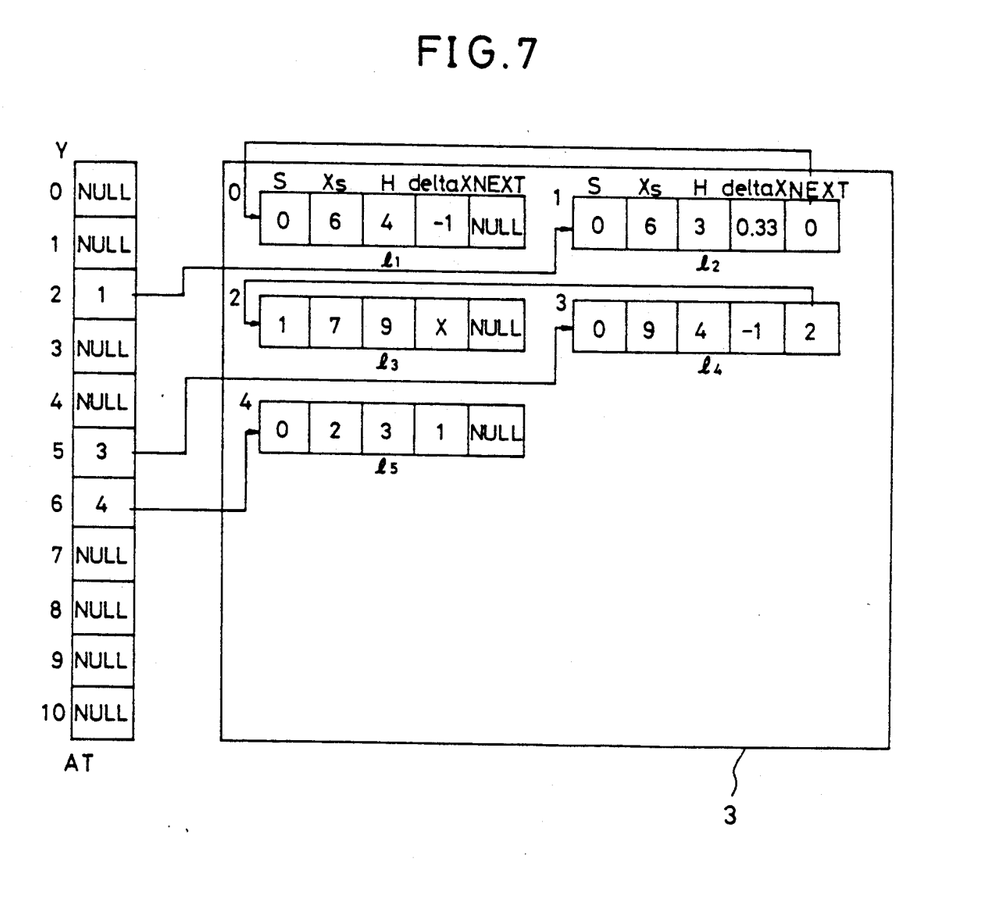
FIG. 7 is a view illustrating an edge table obtained when the figure of FIG. 6 is processed.

FIG. 7 schematically shows the contents of the address table memory 4 (that is, an address table AT) and the contents of the edge table memory 3. The illustrated contents correspond to the results of creation of the edge table in the following edge table creating procedure. In the illustrated address table has storage areas from $Y=1$ to $Y=10$. The edge table of a one-direction list structure in which a pointer NEXT is used which is provided for each of the groups of data (each edge table or edge). An address of the next data group in the edge table memory 3 is stored in the pointer NEXT of an edge table of concern. Thereby, it becomes possible by tracing the contents of the pointers NEXT to obtain edges having the same Y coordinate value which are linked from the address stored in the address table AT.

After initializing the address table table AT, an internal register R (not shown) provided in the CPU 1 is initialized so as to indicate the start address of the edge table memory 3 to be used. It is now assumed that the internal register R is set equal to 0 as the start address. The internal register R indicates the address of the edge table memory 3. Then the creation of the edge table is started.

The host computer (not shown) sends the CPU 1 the following data as vector data:

$X_1, Y_1, X_2, Y_2, X_3, Y_3, X_4, Y_4, X_5, Y_5, X_1, Y_1,$ EOP, EOD where EOP indicates the end of one closed loop figure, and EOD indicates the end of data. In the case of FIG. 6, in actuality, the following coordinate values are supplied to the CPU 1:

2, 6, 6, 2, 7, 5, 9, 5, 5, 9, 2, 6, EOP, EOD

Then, the CPU 1 extracts coordinate data for every two consecutive pairs of data, such as [$(X_i, Y_i)$, $(X_{i+1}, Y_{i+1})$], and [$(X_{i+1}, Y_{i+1})$, $(X_{i+2}, Y_{i+2})$]. At first, $X_i, Y_i, X_{i+1},$ and $Y_{i+1}$, are extracted and supplied to the operation circuit 6 under the control of the CPU 1. In the present example, $X_1(=2)$, $Y_1(=6)$, $X_2(=6)$ and $Y_2(=2)$ are extracted and supplied to the operation circuit 6. Then, the operation circuit shown in FIG. 2 calculates data S, Sx, Ys, H and delta$-$X. When $X_1=2$, $Y_1=6$, $X_2=6$, and $Y_2=2$, the following data values are obtained; $S=0$, $Ys=2$, $Ye=6$, $Xs=6$, $Xe=2$, $H=Ye-Ys=4$, and delta$-X=-1$.

Figure 8A:
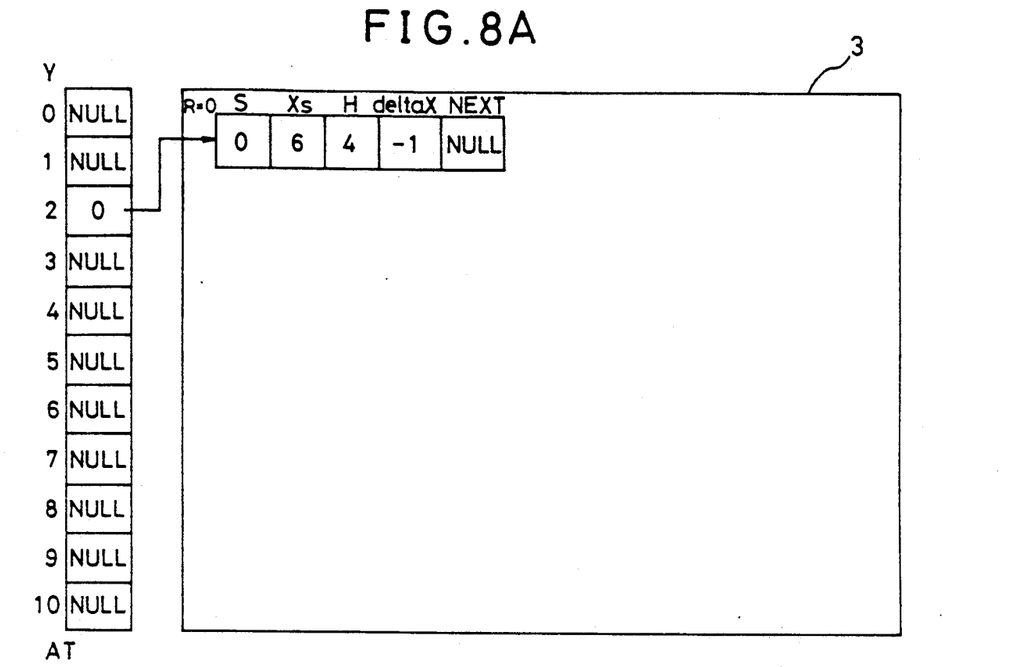
FIGS. 8A and 8B are views illustrating how to create the edge table.

Then, by using those data, the CPU 1 creates an edge table formed in the edge table memory 3 associated with the address table AT formed in the address table memory 4 as follows. First, the CPU 1 supplies the edge table memory 3 with the address stored in the internal register R of the CPU 1. Initially, the address is equal to 0, for example. Then, data S, Xs, H, delta-X and NEXT are written into a storage areas related to address 0, as shown in FIG. 8A. Initially, NULL is written into the storage area related to NEXT. The content of NEXT (pointer) is address information on a storage area in which the next data is stored. NULL is an arbitrary address which is not actually used. Then the current address of the internal register R is written into a table area of the address table AT related to the Y coordinate value corresponding to the start point Ys. In the present case, since Ys=2 and R=0, 0 is written into the table area related to a Y coordinate value of 2.

Thereafter, an address value corresponding to a storage area of the edge table memory 3 necessary to store data S, Xs, H, delta−X and NEXT is added to the current address value in the internal register R. Thereby the internal register R becomes indicative of the next storage area in the edge table memory 3. It is now assumed that the next storage area is indicated by a value of 1.

Figure 8B:
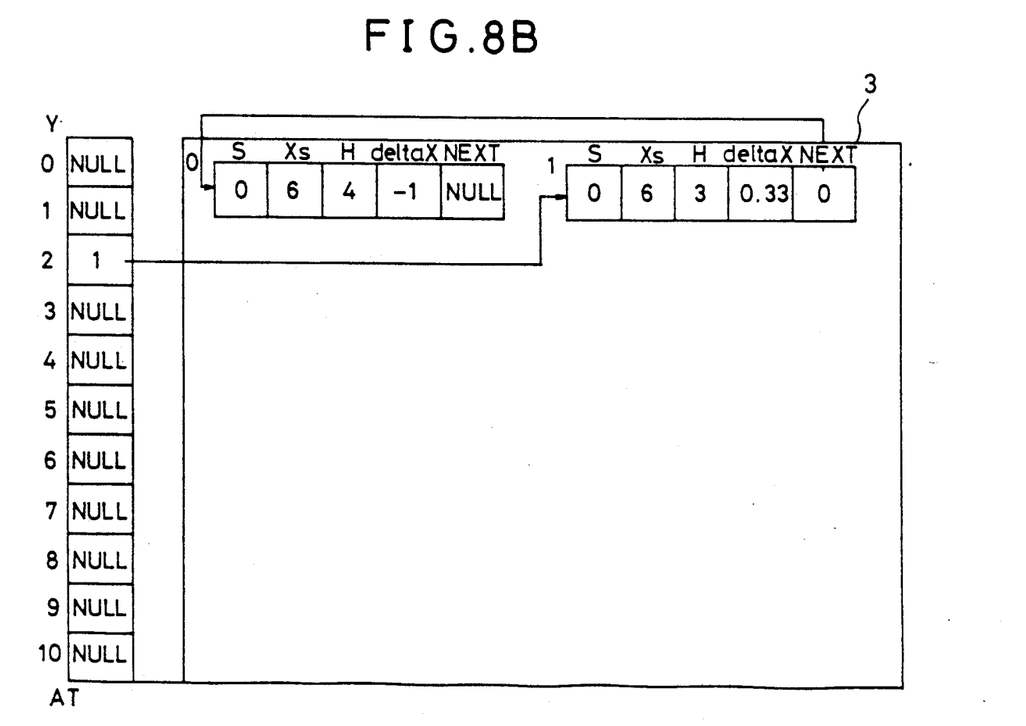

Next, the CPU 1 extracts and processes $X_2$, $Y_2$, $X_3$ and $Y_3$ in the same manner as the aforementioned manner. Since $X_2=6$, $Y_2=2$, $X_3=7$, and $Y_3=5$, the operation circuit 6 outputs S=0, Ys=2, Xs=6, H=3, and delta−X=0.33. The internal register R indicates a storage area used for storing those data. Then, the above-mentioned data are written into the storage area, as shown in FIG. 8B. The pointer NEXT is provided with address data related to the Y coordinate of the start point Ys. In the present case, 0 has been written into the table area related to Ys (=2), as shown in FIG. 8A. Therefore, 0 is written into the storage area related to the pointer NEXT. Then, the table area related to the start point Ys is provided with the present address value of the internal register R. In the present case, the internal register R indicates a value of 1, and thus the table area related to Ys (=2) is provided with a value of 1. In the above-mentioned manner, the address edge table shown in FIG. 8B is created.

The above-mentioned procedure is repeatedly carried out until the end-of-path EOP appears. In the aforementioned data sequence, in case coordinate data exist after the end-of-path EOP, the contents of the edge table, the address table, and the internal register R are held as they are, and a procedure identical to the aforementioned procedure is carried out from the coordinate data after the end-of-path EOP.

In this manner, the edge table shown in FIG. 7 is created. After completing the creation of edge table, three active-edge tables LAET, HAET and PAET are created for each of the Y coordinate values in accordance with an algorithm shown in FIGS. 9A and 9B.

Figure 9A:
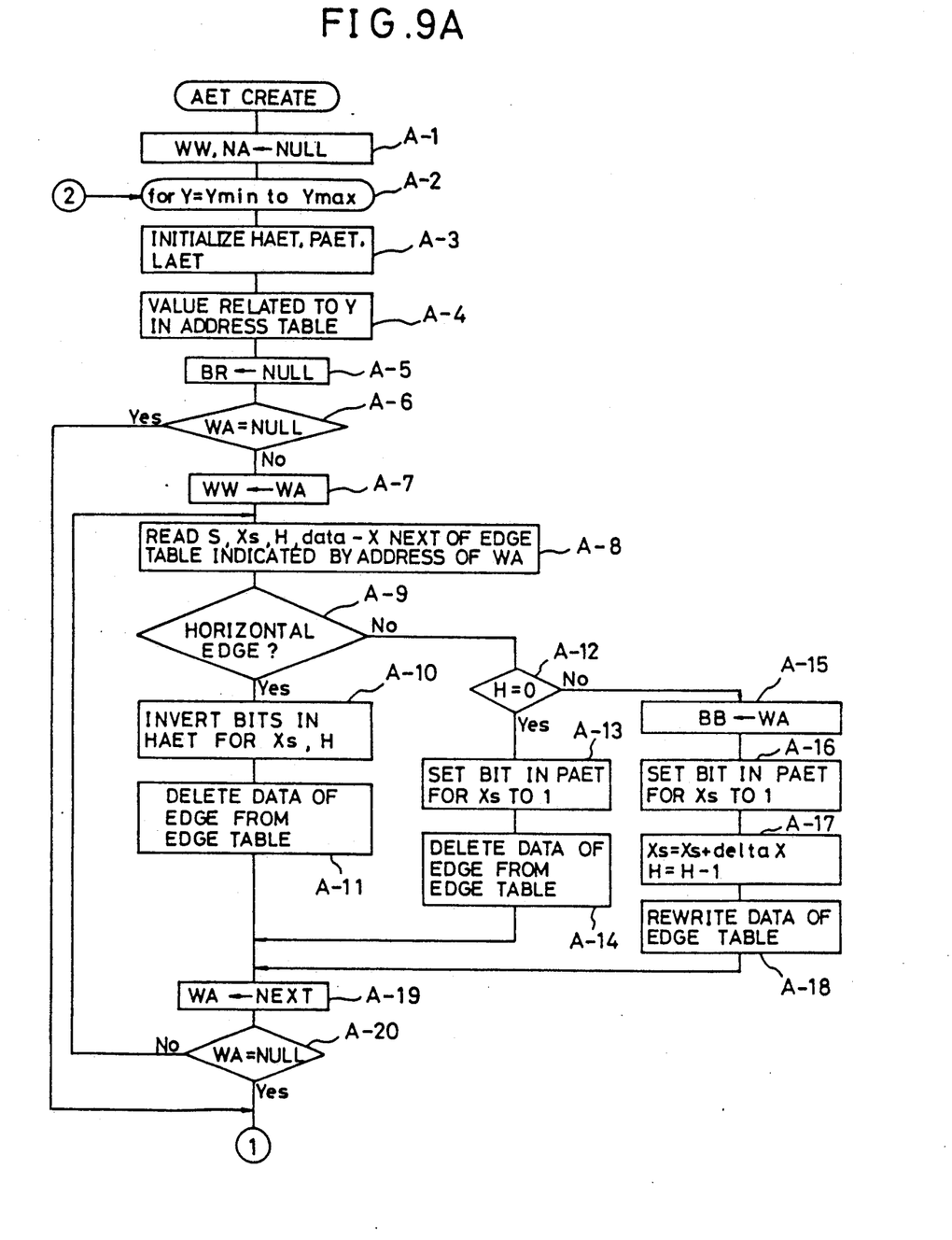
FIGS. 9A and 9B are flowcharts of an operation of the embodiment.
Figure 9B:
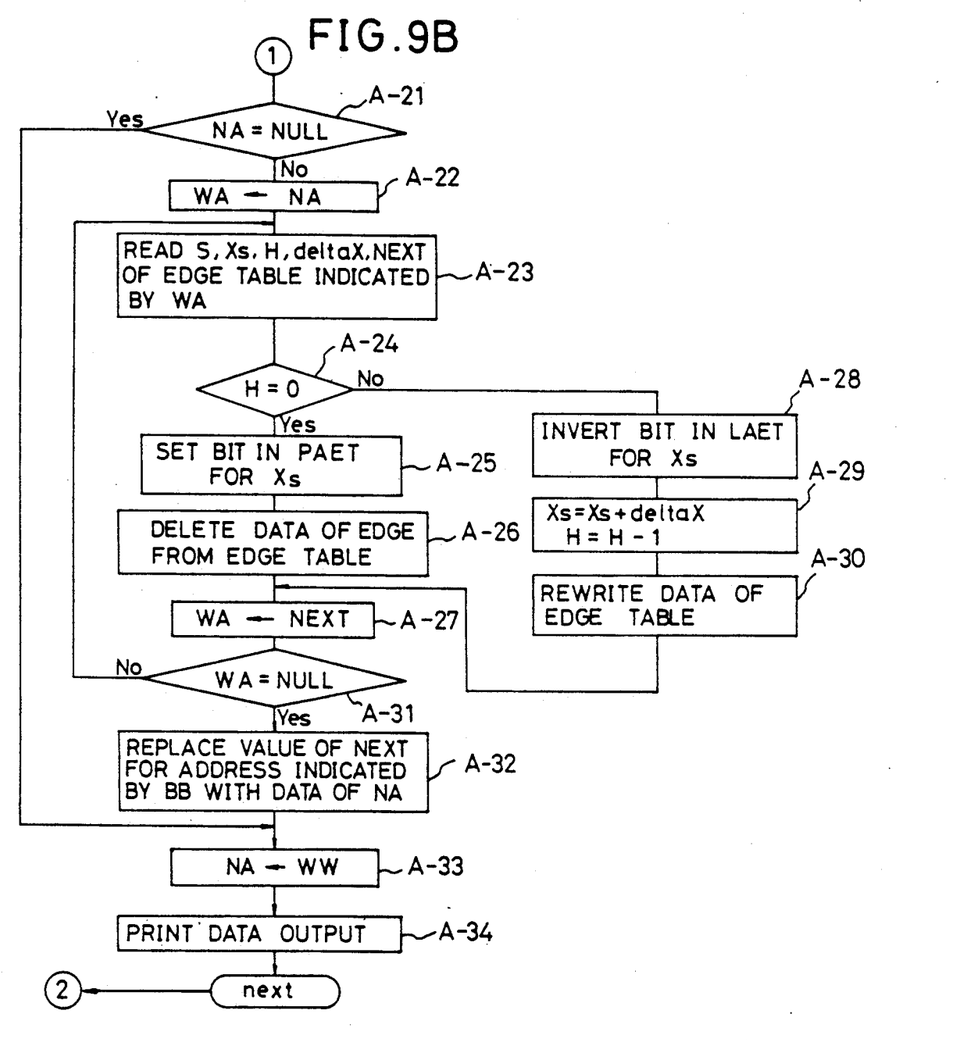

A description is given of a procedure for generating data used for filling the internal area of the figure shown in FIG. 6 from the edge table shown in FIG. 7 in accordance to the algorithm shown in FIGS. 9A and 9B. It is noted that those data are provided by forming the aforementioned active-edge tables LAET, HAET and PAET. In the following procedure, four registers WW, NA, WA and BB provided in the CUP 1 are used as working registers.

The procedure commences to initialize the registers WW and NA to write NULL therein (step A-1). Next, the CPU 1 changes Y coordinate values from Ymin to Ymax one by one (step A-2). In the present example, Ymin=0 and Ymax=10. Then the address data HAET, PAET and LAET are initialized so that all the address data are set equal to 0 (step A-3). Then, a Y coordinate value of the address table formed in the address table memory 3 is written into the register WA (step A-4). The Y coordinate value is sequentially selected from the smallest Y coordinate value. Now, Y=0, and the address related to Y=0 is NULL, as shown in FIG. 7. Therefore, NULL is written into the register WA.

Then, the register BB is initialized by writing NULL therein (step A-5). Thereafter, it is determined whether the register WA has NULL (step A-6). In the present case, the result in step A-6 is YES. Therefore, the procedure proceeds to step A-21 shown in FIG. 9B. In step A-21, the CPU 1 determines whether NA=NULL. In the present case, the result in step A-21 is YES. Therefore, the procedure proceeds to step A-33. In step A-33, the CPU 1 writes the value stored in the register WW into the register NA. Then, print data is supplied to the printer (not shown) through the active-edge table 7 shown in FIG. 1 (step A-34). It is noted that when Y=0, no black pixel is included in the print data.

After that, the Y coordinate value is incremented by +1 (step A-2), and the procedure from step A-3 is carried out in the same manner. It can be seen from FIG. 6 and FIG. 7, no image is formed by the print data related to Y=1.

Then, the Y coordinate value is incremented by +1 (step A-2), and is made equal to 2. Then the procedure from step A-3 is performed. At this time, the registers WW, NA, WA and BB are still held in the initialized state (NULL). The procedure in step A-3 is performed, and an address value of 1 related to the table area for Y=2, is written into the register WA (step A-4). Then, NULL is written into the register BB (step A-5). Then it is determined whether the value in the register WA is NULL (step A-6). In the present case, the result is NO. Therefore, the value in the register WA is written into the register WW (step A-7). In the present case, a value of 1 is written into the register WW. Then, the CPU 1 extracts data S, Xs, H, delta−X and NEXT related to the address indicated by the register WA (step A-8). For WA=1, S=0, Xs=6, H=3, delta−X=0.33 and NEXT=0. The extracted data in this step is related to a line having a Y coordinate value of 2 as the start point (line $l_2$ in the present case). Then, it is determined whether the present edge is a horizontal edge by referring to data S (step A-9). In the present case, S=0 and therefore the edge is not horizontal edge. Thus, the procedure proceeds to step A-12, where it is determined whether H=0. It is noted that step A-12 is executed only when an edge in which the current Y coordinate value is the start point is processed. Therefore, when H=0, the edge of concern is absolutely a horizontal edge. As a result, steps A-12, A-13 and A-14 may be omitted.

Figure 10A:
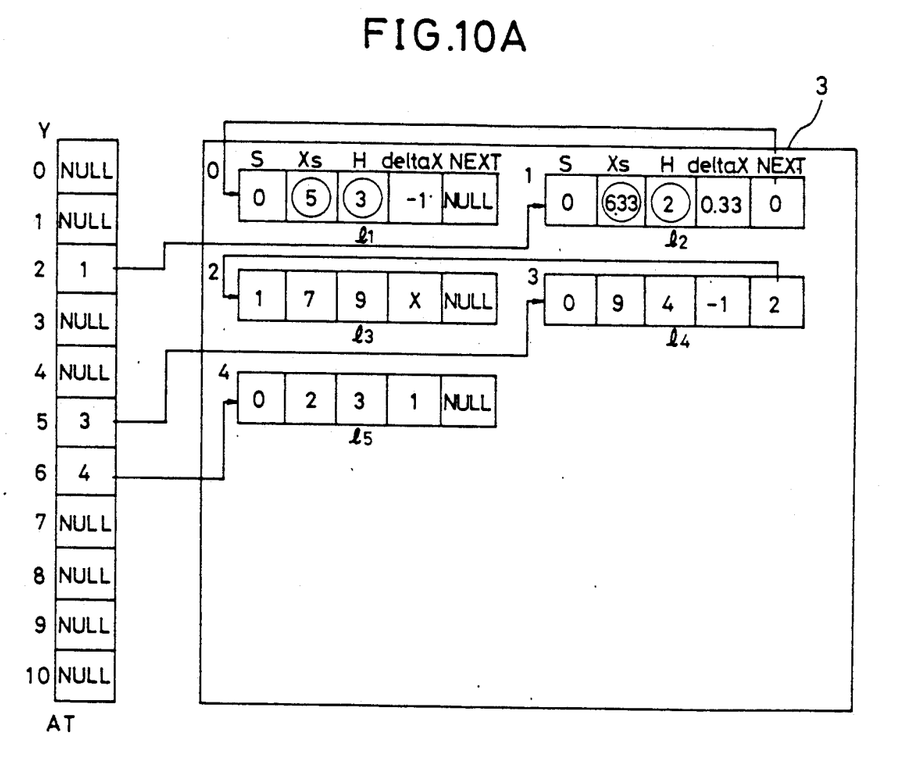
FIGS. 10A through 10D are views illustrating how to create the active-edge table.

Now, H=3 and thus the result in step A-12 is NO. Therefore, the procedure proceeds to step A-15, where the value in the register WA is written into the register BB. In the present case, a value of 1 is written into the register BB. Then a value of 1 is written into a bit in the active-edge table PAET for endpoints which is related to Xs=6 (step A-16). Then the following is calculated (step A-17): Xs=Xs+delta−X, and H=H−1. Now, Xs=6+0.33 =6.33, and H=3 −1=2. Then the contents of the data Xs and H related to the edge indicated by the value in the register WA are replaced with the values obtained in step A-17. Thereafter, the value of the pointer NEXT (=0 in the present case) is inserted into the register WA (step A-19). Then, it is discerned whether the value of the register WA is NULL (step A-31). In the present case, WA≠NULL, and thus the procedure returns to step A-8. Thereafter, steps A-15 through A-20 are carried out. As a result, the contents of the edge table memory 3 are changed as shown in FIG. 10A. The value of the register BB becomes zero by the execution of step A-20.

At this time, NA≠NULL in step A-21 and therefore the procedure proceeds to step A-33, where the current value (1 in the present case) is written into the register NA. Then step A-34 is executed. In the present case, a value of 1 is defined for an X coordinate value equal to 6 in the active-edge table PAET. Therefore, the print line related to Y=2 has a black pixel related to only X=6.

Figure 10B:
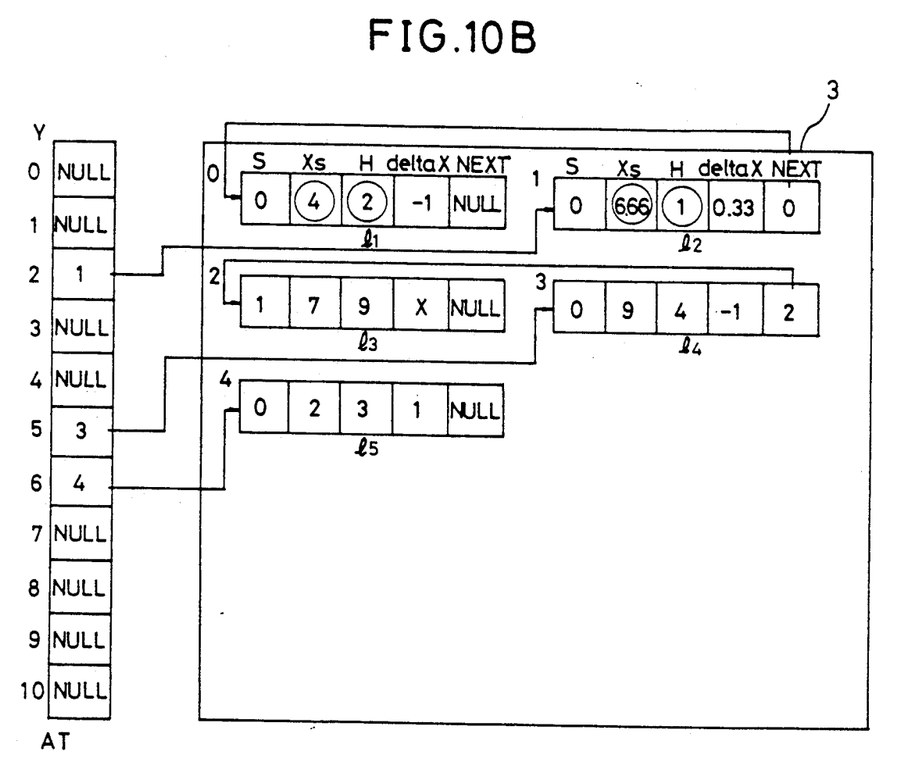

Next, the Y coordinate value is incremented by 1, so that Y is set equal to 3 (step A-2). Then step A-3 is executed. At this time, BB=1, NA=1, WA=0 and WW=1. Then the register WA is set to NULL (step A-5), and the register BB is set to NULL (step A-6). Since WA=NULL in step A-6, the procedure proceeds to step A-21. Since NA≠NULL in step A-21, the value of the register NA (=1 in the present case) is written into the register WA (step A-22). Then at step A-23, data indicated by the value of the register WA (=1, in the present case), are extracted from the edge table memory 3 shown in FIG. 10A. The extracted data are S=0, Xs=6.33, H=2, delta−X=0.33, and NEXT=0. It is noted that the data extracted at step A-23 are related to an edge which does not have the present Y coordinate value (=3 in the present case) as the start point. Then it is discerned whether H=0 (step A-24). Since H≠0 in the present case, the procedure proceeds to step A-28, where the bit related to Xs in the active-edge table LAET related to a non-horizontal edge (Xs=INT(6.33)=6) is inverted. INT(t) means an integer of t. Then, Xs=Xs+delta−X and H=H−1 are calculated (step A-29). In the present case, Xs=Xs+delta−X=6.33 +0.33=6.66, and H=2−1=1. Then, Xs and H related to the address indicated by the register WA (an address 1 in the present case) are provided with the values calculated at step A-29 (step A-30). Then, the value of the pointer NEXT (=0 in the present case) is inserted into the register WA (step A-27). Subsequently, it is determined whether WA=NULL (step A-31). Since WA≠NULL in the present case, the procedure proceeds to step A-23. Thereafter, steps A-24, A-28, A-29 and A-30 are executed. As a result, bits related to X=6 and 5 are set equal to 1. Thereby, the contents of the edge table memory 3 are changed as shown in FIG. 10B.

Thereafter, the value of NEXT is inserted into the register WA (step A-27). In the present case, NEXT=NULL. Then it is determined whether WA=NULL (step A-31). In the present case, WA=NULL, and therefore the procedure proceeds to step A-32, in which the content of the pointer NEXT related to the address indicated by the register BB is replaced with the content of the register NA. The address indicated by the register BB indicates data related to an edge which has the current Y coordinate value as the start point and which has not been deleted and has last been processed. Now, the register BB has NULL, and step A-32 is not executed. Then, the print data is output at step A-34. The active-edge table LAET for a non-horizontal edge has bits related to X =6, 5. Therefore, the line for Y=3 has black pixels at X coordinate values of 5 and 6. Lines from Y=4 are processed in the same manner. Thereby, area filling data can be formed. In step A-9, if an edge of concern is a horizontal edge, the procedure proceeds to step A-10, where bits related to data Xs and H in the active-edge table HAET related to a horizontal edge are inverted. Then, data related to this edge is deleted from the edge table.

Figure 10C:
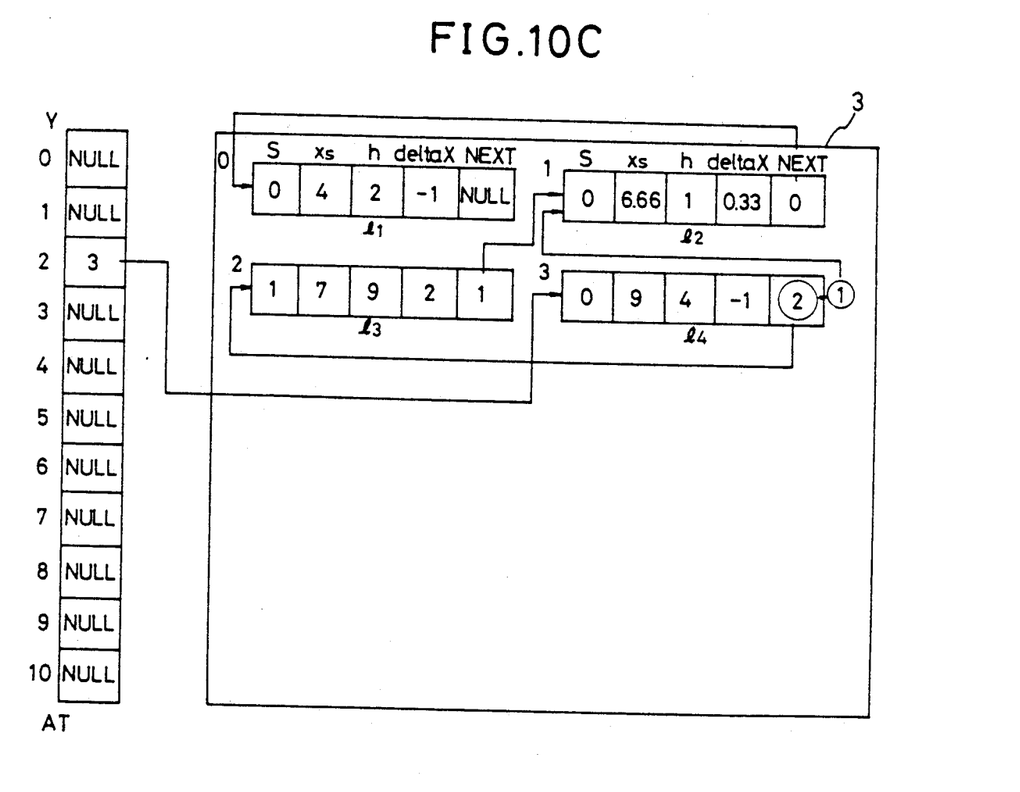
Figure 10D:
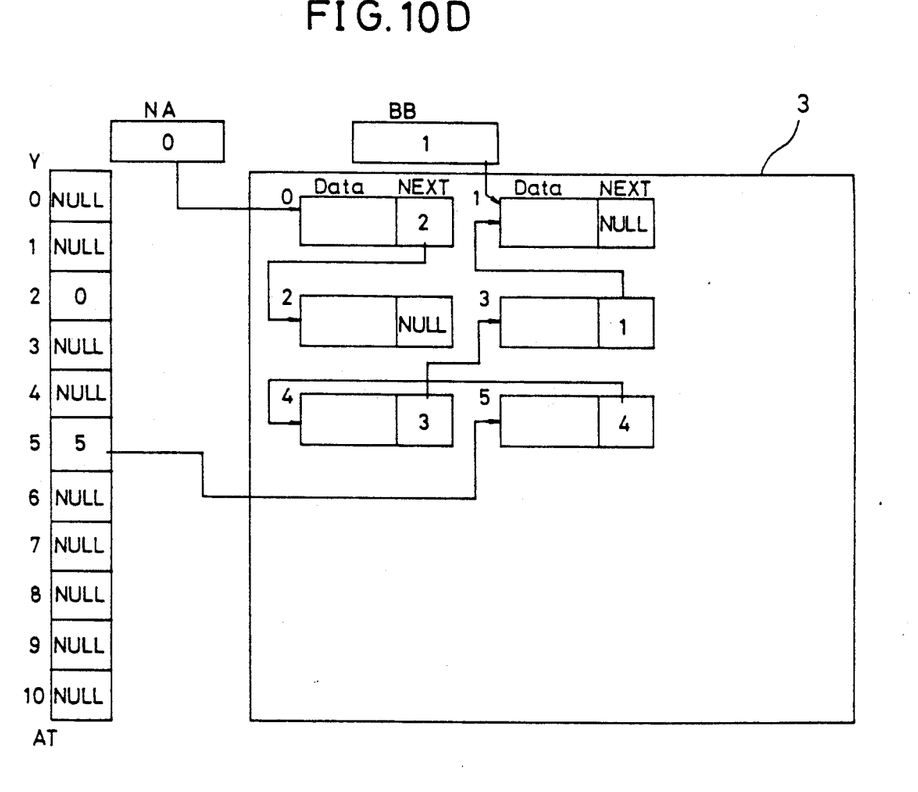

It is noted that an edge which has been completely processed is deleted from the edge table memory 3. This can be done by copying the data of the pointer NEXT related to an edge to be deleted to the pointer which indicates the edge to be deleted. FIG. 10C illustrates an example of this procedure. The table area at Y=2 indicates an address of 3 (edge $l_4$), the pointer NEXT of which indicates an address of 2 (edge $l_3$). The pointer NEXT related to the edge $l_3$ indicates an address of 1 (edge $l_2$), the pointer NEXT of which indicates an address of 0 (edge $l_1$). If data related to the line $l_3$ is to be deleted, the value of the pointer NEXT related to the edge $l_3$ to be deleted is written into the pointer NEXT related to the edge $l_4$ which indicates the edge ($l_3$) to be deleted. That is, the value of the pointer NEXT related to the edge 4 is changed from 2 to 1. Thereby, the edge $l_3$ is deleted from the edge table memory 3.

The process in step A-32 is done by setting the pointer NEXT related to an edge which has the current Y coordinate value as the starting point and which has not yet been deleted and has last been processed, to an address of the edge table related to an edge which does not have the current Y coordinate value and which has not yet been deleted and has last been processed. Thereby, data related to the edge which does not have the current Y coordinate value as the start point and has not yet been deleted, is chained to the edge which has the current Y coordinate value as the start point and has not yet been deleted.

It is now assumed that when Y=5, step A-32 is executed. At this time, the register BB indicates an address related to data of an edge which has a Y coordinate value of 5 as the start point and which has has not yet been deleted and has last been processed. The register NA indicates an address related to data of an edge which does not have a Y coordinate value of 5 as the start point and which has not yet been deleted and has last been processed. By inserting the value of the register NA into the pointer NEXT indicated by the register BB, data which does not have a Y coordinate value of 5 as the start point is joined. After that, the register NA is provided with the value (=5) stored in the table area of the address table AT corresponding to Y =5. Then Y is set equal to 6, and the register NA indicates an address related to data which does not have a Y coordinate value of 6 as the start point and which has not yet been deleted and is to be first processed.

The present invention is not limited to the above-mentioned embodiment, and variations and modifications may be made without departing from the scope of the present invention.

What is claimed is:

1. An area filling device comprising:
    receiving means for receiving X-Y coordinate data related to endpoints of edges consisting of a closed loop figure from an external device;
    edge table storing means for storing an edge table having data related to said edges;
    address table means for storing edge table address data for every Y coordinate value;
    operation means, connected to said receiving means, said edge table storing means and address table means, for calculating said data related to said edges from said endpoints supplied from said receiving means and for writing calculated data into a storage area of said edge table storing means indicated by said edge table address data defined in said address table means;

active-edge table forming means, coupled to said edge table storing means and said address table means, for forming first, second and third active-edge tables for every Y coordinate value from said data related to the edges stored in said edge table storing means, said first active-edge table indicating bit value data having a predetermined bit at an X coordinate position where there is an edge which is not a horizontal edge, said second active-edge table indicating bit value data having a predetermined bit at X coordinate positions where there are endpoints of a horizontal edge, said third active-edge table indicating bit value data having a predetermined bit at an X coordinate position where there is an endpoint of an edge;

logic means, coupled to said active-edge table forming means, for inverting said bit data included in said first active-edge table each time said predetermined bit defined in said first active-edge table appears and for inverting said bit data included in said second active-edge table each time said predetermined bit defined in said second active-edge table appears; and OR gate means, coupled to said active-edge table forming means and said logic means, for receiving said bit data related to said first and second active-edge tables and supplied from said logic means and said bit data related to said third active-edge table and supplied from said active-edge table forming means and for calculating an OR operation on said received bit data, the results of the OR operation obtained for every Y coordinate value forming print data.

2. An area filling device as claimed in claim 1, wherein said operation means comprises:

comparator means for comparing Y coordinate values related to two endpoints of each of said edges and outputting the result serving as first data indicating whether said edge is a horizontal edge;

first logic means for receiving X-Y coordinate data related to said two endpoints of one of said edges, generating therefrom second data indicating a start address which corresponds to one of the X coordinate values related to smaller one of the Y coordinate values of said two endpoints;

second logic means for generating third data indicating a height of said edge in the Y coordinate direction from said X-Y coordinate data related to said two endpoints; and third means for generating fourth data indicating an inclination of said edge from said X-Y coordinate data related to said two endpoints, said first to fourth data forming said data to be stored in said edge table formed in said edge table storing means.

3. An area filling device as claimed in claim 1, wherein said active-edge table forming means comprises first memory means for storing said first active-edge table, second memory means for storing said second active-edge table, and third memory means for storing said third active-edge table, and wherein each of said first, second and third memory means has a storage capacity equal to one line in the direction of the X coordinate.

4. An area filling device as claimed in claim 3, wherein each of said first, second and third memory means outputs said first, second and third active-edge tables in serial form, respectively.

5. An area filling device as claimed in claim 3, wherein each of said first and second memory means includes flip-flops and a shift register coupled to said flip-flops.

6. An area filling device as claimed in claim 5, wherein each of said first and second memory means includes a plurality of flip-flops equal to said storage capacity.

7. An area filling device as claimed in claim 3, wherein said third memory means includes a random access memory.

8. An area filling device as claimed in claim 1, wherein:

said logic means includes a D-type flip-flop provided for each of said first and second active-edge tables, said D-type flip-flop has a clock terminal, an input terminal and Q-and $\overline{Q}$-output terminals, said clock terminal is supplied with the bit data related to corresponding one of said first and second active-edge tables, said $\overline{Q}$-output terminal is connected to said input terminal, and said Q output terminal is coupled to said AND gate means.

9. An area filling device as claimed in claim 1, wherein said data stored in said edge table storing means includes a pointer which indicates a storage area in the edge table storing means where data related to another edge positioned in the same Y coordinate value is stored, so that edges positioned in the same Y coordinate value can be linked together.

10. An area filling device as claimed in claim 1, wherein said predetermined bit value indicates a black pixel.

11. An area filling device as claimed in claim 1, wherein said results of the OR operation are supplied to a printer coupled to said area filling device.

* * * * *